(12) United States Patent
Tatezono et al.

(10) Patent No.: US 7,054,138 B2
(45) Date of Patent: May 30, 2006

(54) ELECTRIC DOUBLE LAYER CAPACITOR AND ELECTROLYTE BATTERY

(75) Inventors: Fumio Tatezono, Hirakata (JP); Seiji Omura, Daito (JP); Kiyotaka Ito, Daito (JP); Tsuyoshi Komatsu, Imaichi (JP); Makoto Hashimoto, Nikko (JP)

(73) Assignees: Sanyo Electric Co., Ltd., Moriguchi (JP); Furukawa Precision Engineering Co., Inc., Nikko (JP)

( * ) Notice: Subject to any disclaimer, the term of this patent is extended or adjusted under 35 U.S.C. 154(b) by 31 days.

(21) Appl. No.: 11/084,101

(22) Filed: Mar. 21, 2005

(65) Prior Publication Data

US 2005/0213285 A1    Sep. 29, 2005

(30) Foreign Application Priority Data

Mar. 23, 2004    (JP)    ............... 2004-083789

(51) Int. Cl.
*H01G 9/04*    (2006.01)
(52) U.S. Cl. ............... 361/502; 361/508; 361/516; 429/163; 429/176
(58) Field of Classification Search ............... 361/502, 361/503, 512, 516, 523, 532, 504, 525; 29/25.03; 429/163, 176, 185, 188, 191, 177
See application file for complete search history.

(56) References Cited

U.S. PATENT DOCUMENTS 5,953,204 A    9/1999 Suhara et al.
6,426,863 B1 *   7/2002 Munshi ............... 361/503
6,574,092 B1 *   6/2003 Sato et al. ............... 361/502
6,636,417 B1 *  10/2003 Sakata et al. ............... 361/502
6,657,850 B1 *  12/2003 Nakazawa et al. ............... 361/502
2003/0124421 A1   7/2003 Issaev et al.

FOREIGN PATENT DOCUMENTS

| JP | 55 105959 A | 8/1980 |
|---|---|---|
| JP | 2001 152160 A | 11/1981 |
| JP | 03 122964 A | 5/1991 |
| JP | 07 130577 A | 5/1995 |
| JP | 2001 155972 A | 6/2001 |
| JP | 2001-351833 | 12/2001 |

* cited by examiner

*Primary Examiner*—Anthony Dinkins

(74) *Attorney, Agent, or Firm*—Armstrong, Kratz, Quintos, Hanson & Brooks, LLP

(57) ABSTRACT

An electric double layer capacitor is provided with a cell, in which a pair of polarizable electrodes, which are impregnated with an electrolyte, are disposed in opposition on either side of a separator; wherein the polarizable electrodes are provided with collector electrodes, and a peripheral portion of the cell is sealed by a sealing member composed of synthetic resin. The collector electrodes are composed of an alloy made of crystal grains of differing components and the collector electrodes pass through the sealing member while in intimate contact with the sealing member, extending to the outside of the sealing member. A metal plated layer made of crystal grains of a single component is formed on those locations on the collector electrodes that pass through the sealing member.

7 Claims, 3 Drawing Sheets

ELECTRIC DOUBLE LAYER CAPACITOR AND ELECTROLYTE BATTERY

BACKGROUND OF THE INVENTION

1. Field of the Invention

The present invention relates to an electric double layer capacitor and an electrolyte battery.

2. Description of the Related Art

Electric double layer capacitors are devices with excellent charge-discharge behavior.

FIG. 6 is a cross-sectional view showing a cell (2) constituting a conventional electric double layer capacitor (1), as disclosed in JP 2001-351833A, for example. In it, a pair of polarizable electrodes (20) and (21) are stacked, sandwiching a separator (6), with metal collector electrodes (3) and (30) attached to outer sides of the polarizable electrodes (20) and (21). The polarizable electrodes (20) and (21) are composed by adding a conductive polymer, such as polypyrrole, to an active carbon that is in powder or fiber form, hardening this with a bonding material, and pressure forming. The polarizable electrodes (20) and (21) are impregnated with an electrolyte such as sulfuric acid. It is also possible to use a non-aqueous electrolyte as described below instead of an aqueous electrolyte such as sulfuric acid.

A peripheral portion of the polarizable electrodes (20) and (21) is sealed by an insulating sealing member (4) composed of synthetic resin, and this sealing member (4) prevents the electrolyte from leaking out of the cell (2). Ordinarily, the cell (2) comprises two or more horizontally arrayed electric double layer capacitors (1).

When charging, one collector electrode (3) is connected to a positive side of a power source, the other collector electrode (30) is connected to a negative side of a power source, and a dc voltage is applied. Negative ions are attracted to the polarizable electrode (20) connected to the positive-side collector electrode (3), while positive ions are attracted to the polarizable electrode (21) connected to the negative-side collector electrode (3), thereby forming an electric double layer between the polarizable electrodes (3) (30).

When discharging, the collector electrodes (3) and (30) are electrically connected. The electric charge accumulated in the polarizable electrodes (20) and (21) is discharged.

Alloys containing iron, steel, nickel, and/or chrome, etc., which are conductive, have excellent mechanical strength, and are low-cost, are used for the collector electrodes.

However, there are the following problems with the electric double layer capacitor (1) described above.

The collector electrodes (3) and (30), which are made of alloys, and the sealing member (4), which is made of resin, adhere to one another due to chemical bonding between the resin and oxygen in the natural oxide film on the surface of the collector electrodes (3) and (30).

However, there may be fluctuations in the surface oxidation of alloys made of crystal grains of differing components. Therefore, there is a possibility of the electrolyte impregnated in the polarization electrodes (20) and (21) leaking from portions of weak adherence between the collector electrodes (3) and (30) and the sealing member (4), and of moisture outside the cell (2) entering the inside of the sealing member (4).

Specifically, in the case of non-aqueous electrolytes, entry of moisture from outside causes electrolysis inside the cell (2), leading to a drop in performance as an electric double layer capacitor.

The present invention has as an object to provide an electric double layer capacitor and an electrolyte battery which prevent leaking of the electrolyte and entry of moisture from outside.

SUMMARY OF THE INVENTION

An electric double layer capacitor includes:
a cell (2) in which a pair of polarizable electrodes (20) and (21), which are impregnated with an electrolyte, are disposed in opposition on either side of a separator (6);
wherein the polarizable electrodes (20) and (21) are provided with collector electrodes (3) and (30) and a peripheral portion of the cell (2) is sealed by a sealing member (4) composed of synthetic resin;
wherein the collector electrodes (3) and (30) are composed of an alloy made of crystal grains of differing components and wherein the collector electrodes (3) and (30) pass through the sealing member (4) while in intimate contact with the sealing member (4), extending to the outside of the sealing member (4); and
wherein a metal plated layer (5) made of crystal grains of a single component is formed on those locations on the collector electrodes (3) and (30) that pass through the sealing member (4).

EFFECT OF THE INVENTION

A natural oxide film with a uniform thickness is formed on a surface of a metal plated layer (5) by forming the metal plated layer (5), which is composed of crystal grains of a single component, on collector electrodes (3) and (30). This stabilizes the adhering strength and effectively prevents leaking of electrolyte and entry of moisture from outside.

Forming a metal plated layer (5) on the collector electrodes (3) and (30) causes many metal grains to attach to the collector electrodes (3) and (30). The surface roughness of the collector electrodes (3) and (30) thereby becomes rougher, and the area of contact with the sealing member (4) increases. The adhesiveness between the sealing member (4) and the collector electrodes (3) and (30) can thereby be increased.

DESCRIPTION OF THE PREFERRED EMBODIMENTS

First Embodiment for Aqueous and Non-Aqueous Electric Double Layer Capacitors

Figure 1:
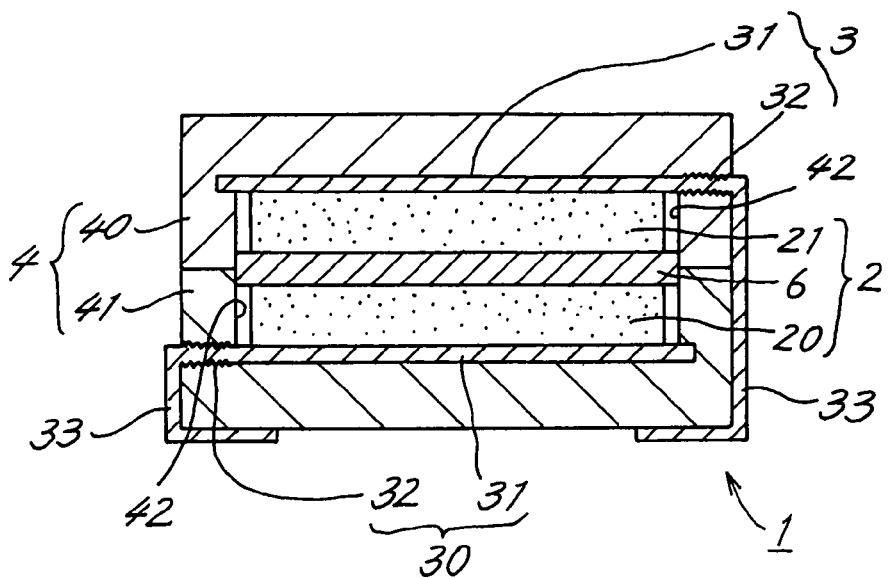
FIG. 1 is a cross-sectional view of an electric double layer capacitor.

FIG. 1 is a cross-sectional view of an electric double layer capacitor (1) according to the present embodiment. A cell (2) is composed, in the conventional manner, of a pair of stacked polarizable electrodes (20) and (21), which sandwich a separator (6), with collector electrodes (3) and (30) made of a stainless steel alloy containing iron, chrome, and nickel, attached to outer sides of the polarizable electrodes (20) and (21). In the following description, the upper polarizable electrode (21) has a negative polarity, while the lower polarizable electrode (20) has a positive polarity. Needless to say, the negative and positive poles may be reversed.

A sealing member (4) is composed by arranging a first case half (40) and a second case half (41) whose central portions are provided with recesses (42), vertically on top of one another so that openings of the recesses (42) abut. The polarizable electrodes (20) and (21) and the separator (6) are arranged inside the recesses (42). The first case half (40) and the second case half (41) are formed from insulating synthetic resin. The insulating resin includes sulfur in a component such as polyphenylene sulfide (PPS, $C_5H_5S$), for reasons described below.

Besides aqueous electrolytes, such as sulfuric acid and potassium hydroxide solutions, non-aqueous electrolytes in which electrolytes such as triethylmethyl ammonium tetrafluoroborate ($Et_3MeNBF_4$) or tetraethyl ammonium tetrafluoroborate ($Et_4NBF_4$) are dissolved in an aprotic organic solvent may be used for the electrolyte with which the polarizable electrodes (20) and (21) are impregnated. Bifunctional solvents such as carbonate, lactone, nitrile, amide, nitroalkane, sulfone, sulfoxide, phosphate, dinitrile, or ether nitrile may be used as the aprotic organic solvent.

Furthermore, for the separator (6), nonwoven glass fiber fabric, paper pulp, polytetrafluoroethylene (PTFE), or other films formed from insulating resin may be used.

The negative collector electrode (3) is provided with a horizontal portion (31) which is in contact with the polarizable electrode (20) or (21), a rough surface portion (32) which connects to the horizontal portion (31) and passes through the first case half (40), and an exposed portion (33) which curves from the rough surface portion (32) along the first case half (40) and the second case half (41). The rough surface portion (32) is in intimate contact with the first case half (40).

Like the negative collector electrode (3), the positive collector electrode (30) is provided with a horizontal portion (31), a rough surface portion (32), which is connected to the horizontal portion (31) and passes through the first case half (40), and an exposed portion (33). The rough surface portion (32) is treated with a surface roughening process and has a center line average roughness of at least 0.3 μm. The surface roughening may be formed by etching, sand-blasting, knurling, or with sandpaper, etc.

Figure 2A:
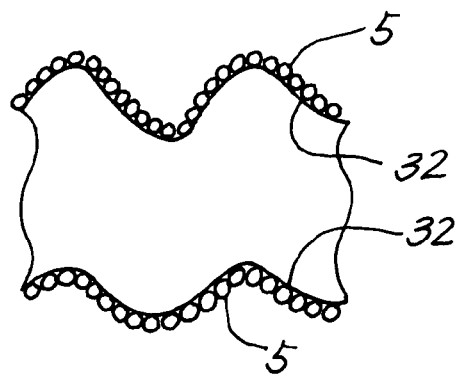
FIGS. 2(*a*) and (*b*) are enlarged views of rough surface portions on collector electrodes.

FIG. 2(a) is an enlarged view of the rough surface portion (32) on the negative collector electrode (3). A metal plated layer (5) of nickel made from crystal grains of a single component, is formed on the rough surface portion (32). Forming the metal plated layer (5) on the rough surface portion (32) creates even finer irregularities than the rough surface portion (32), because the metal grain is small. The surface roughness thereby increases in roughness, increasing the contact area with the first case half (40). This increases the adhesiveness between the first case half (40) and the collector electrode (3), effectively preventing leaking of electrolyte and entry of moisture from outside. A similar metal plated layer (5) is also formed on the rough surface portion (32) of the positive collector electrode (30).

Figure 2B:
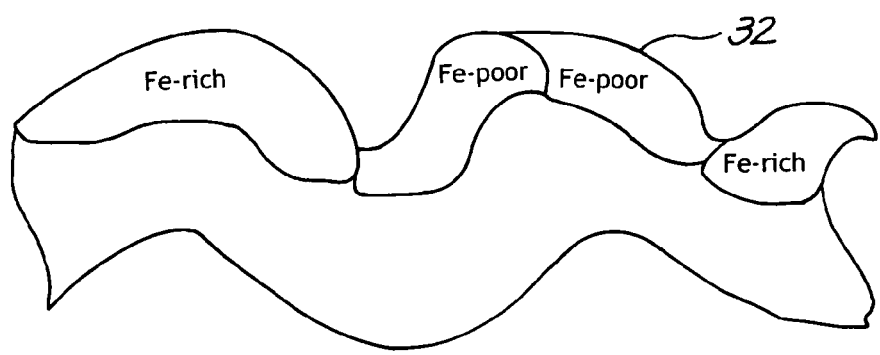

A natural oxide film with a uniform thickness is formed on the metal plated layer (5) by forming the metal plated layer (5), which is made of crystal grains of a single component. In other words, as shown in FIG. 2(b), if the metal plated layer (5) is not formed, the Fe, Cr, and Ni contained in the stainless steel will be exposed on the surface of the rough surface portion (32).

Below follows a detailed description, using iron and nickel contained in the stainless steel as examples. As shown in FIG. 2(b), iron-nickel alloys with high iron content ("Fe-rich") and iron-nickel alloys with low iron content ("Fe-poor") are both present in alloys of iron and nickel. These Fe-rich portions and Fe-poor portions differ in the ease with which each oxidizes. There therefore arise areas with low adherence strength in contact surfaces between the resin and junctions between Fe-rich and Fe-poor portions. Accordingly, forming the metal plated layer (5) composed of crystal grains of a single component makes it possible for a natural oxide film with a uniform thickness to be formed, thereby stabilizing adherence strength.

Additionally, the oxide layer of iron contained in the stainless steel is extremely weak, and can cause cracking and deficiencies, leading to leaking. Providing a metal plated layer (5) therefore prevents oxidation of the iron, effectively preventing leaking of electrolyte and entry of moisture from outside.

After forming the first case half (40) and the second case half (41) from various synthetic resins, the applicant has found that the first case half (40) and the second case half (41) which use PPS have the highest adhesiveness with the collector electrodes (3) and (30). A possible reason for this is that the sulfur contained in the PPS reacts with traces of oxygen present in the metal plated layer (5) due to natural oxidation of the metal plated layer (5), thereby increasing the adhesiveness between the first and second case halves (40) and (41) and the collector electrodes (3) and (30). This, too, prevents leaking of electrolyte and entry of moisture from outside. Heat-resistance is also improved by forming the first case half (40) and second case half (41) from PPS.

It is also possible to form the metal plated layer (5) from a metal other than nickel, but nickel oxidizes less readily than other metals, such as copper, and is effective in preventing the resistance of the collector electrodes (3) and (30) from growing.

Manufacturing Method for an Electric Double Layer Capacitor

Figure 3:
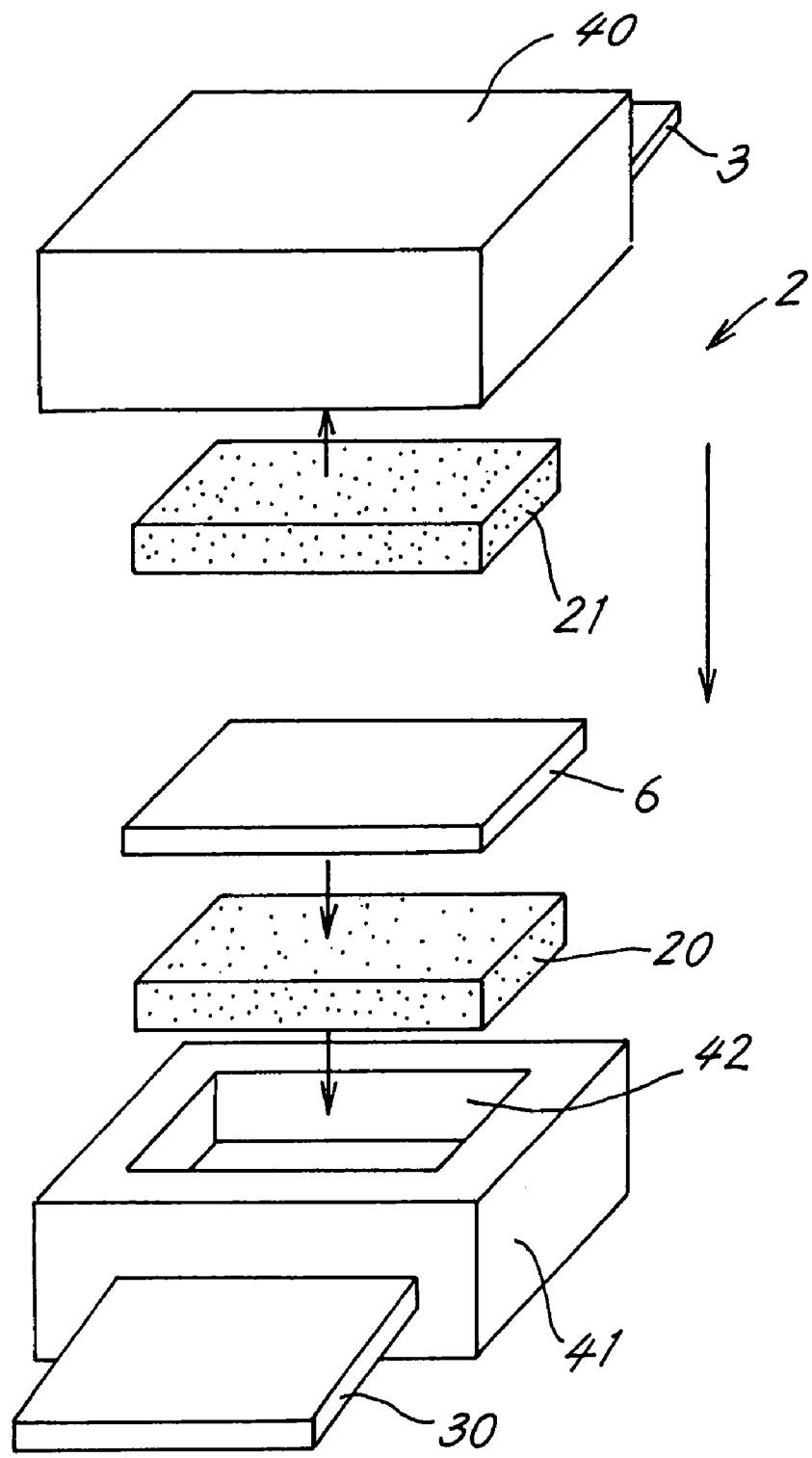
FIG. 3 is an exploded oblique view showing a manufacturing process for an electric double layer capacitor.

The cell (2) of the electric double layer capacitor (1) is configured as shown in FIG. 3. A first case half (40) is formed through insert molding into a negative collector electrode (3). The opening of the recess (not shown) in the first case half (40) is oriented facing down. Similarly, a second case half (41) is formed through insert molding into a positive collector electrode (30), with the opening of the recess (42) in the second case half (41) oriented facing up.

A pair of polarizable electrodes (20) and (21) is arranged, sandwiching a separator (6), inside the recesses (42) in the case halves (40) and (41). The separator (6) and the polarizable electrodes (20) and (21) are impregnated in advance with an electrolyte through vacuum filling. After abutting the case halves (40) and (41), peripheral portions of the case halves (40) and (41) are joined using ultrasonic welding, etc. Thereafter, the exposed portions (33) of the collector electrodes (3) and (30) are bent downwards along the peripheral surface of the case halves (40) and (41), completing the electric double layer capacitor (1) shown in FIG. 1.

Experimental Results

The applicant made 10 units of the electric double layer capacitor (1) using the collector electrodes (3) and (30) on which a metal plated layer (5) made of nickel was formed. The applicant further made 10 units of the electric double layer capacitor (1) using collector electrodes (3) and (30) on which no metal plated layer (5) was formed. In all cases, the first and second case halves (40) and (41) were made of PPS. These electric double layer capacitors (1) were left at room temperature and checked to see how many of the electric double layer capacitors (1) leaked electrolyte after 24 and 72 hours. The findings are shown in Table 1 below.

TABLE 1

|  | With Ni plating | Without Ni plating |
| --- | --- | --- |
| No. of units leaking electrolyte after 24 hours | 0/10 units | 3/10 units |
| No. of units leaking electrolyte after 72 hours | 0/10 units | 4/10 units |

The above findings confirm the ability to prevent leaking of electrolyte by forming a metal plated layer (5) of nickel.

Second Embodiment

Figure 4:
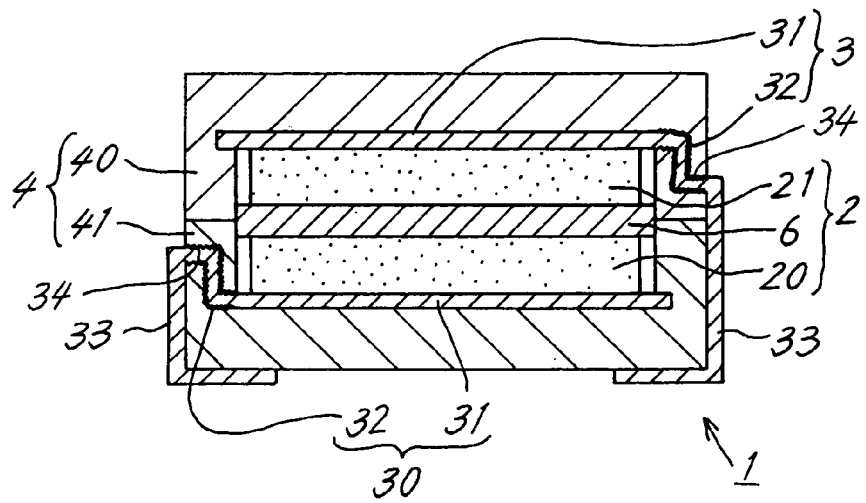
FIG. 4 is a cross-sectional view of another electric double layer capacitor.

The configuration shown in FIG. 4 is also possible in order to effectively prevent leaking of electrolyte and entry of moisture from outside a cell (2). Namely, rough surface portions (32) in a first case half (40) and a second case half (41) are bent into two steps.

Bending the rough surface portions (32) into two steps makes them longer than if the rough surface portions are straight, as shown in FIG. 1. The route for moisture to reach the inside of the cell (2) from outside the sealing member (4) is therefore longer, further stopping leaking of electrolyte and entry of moisture from outside. Subjecting the rough surface portions (32) to a bending machining process further prevents the collector electrodes (3) and (30) from moving inside the first case half (40) and the second case half (41), when the collector electrodes (3) and (30) are bent along an external surface of the sealing member (4). This stabilizes the performance of the electric double layer capacitor (1) and makes it possible to boost yield.

Electrolyte Battery

The electric double layer capacitor (1) has excellent charge-discharge behavior, and can be applied to aqueous or non-aqueous electrolyte batteries.

An electrolyte battery differs from the electric double layer capacitor only in that some of the component materials are different, while the design and manufacturing method are substantively the same.

In the case of a non-aqueous electrolyte battery, the polarizable electrodes of the electric double layer capacitor are replaced with a positive active material body and a negative active material body. For the positive active material body, there are lithium cobaltate, lithium manganate, lithium nickelate, and other materials achieved through pressure forming or sintering of a powder, and for the negative active material body, there are graphite-based carbon materials, coke-based carbon materials, and other materials achieved through pressure forming or sintering of a powder.

Organic solvents in which a lithium salt has been dissolved are used for the electrolyte. Examples of lithium salts include $LiBF_4$, $LiClO_4$, $LiPF_6$, $LiAsF_6$, $Li(CF_3O_2)_2N$, and $LiC_4F_9SO_3$, while organic solvents include propylene carbonate and gamma butyrolactone or a mixture of either of these and a chain carbonate. Examples of chain carbonates include dimethyl carbonate (DMC, DEC) and ethyl methyl carbonate (EMC).

For the separator, a porous polymer film of polyophyllene, polyethylene, polypropylene, or the like may be used.

In the case of aqueous electrolyte batteries such as a lithium ion batteries, there are materials achieved by sintering or compression molding of nickel oxide powder or pellets for the positive active material, and materials achieved by sintering or compression molding of powder or pellets of Mm—Ni—Co—Mn—Al-based hydrogen storing alloys (Mm being a mixture of rare earth elements) for the negative active material.

A potassium hydroxide solution or a polymer hydrogel electrolyte solution can be used for the electrolyte. For the separator, a porous polymer film of sulfonated polypropylene or the like can be used.

Figure 5:
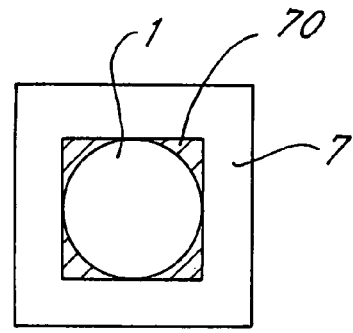
FIG. 5 is a plan view showing a columnar-shaped electric double layer capacitor.
Figure 6:
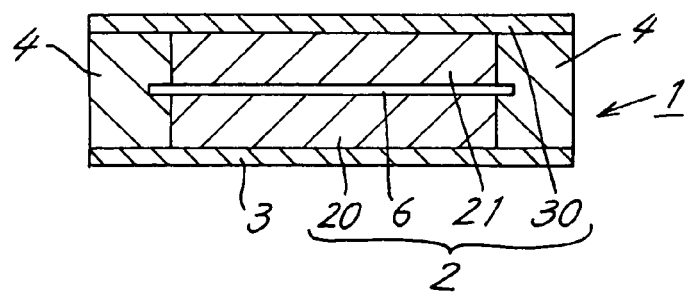
FIG. 6 is a cross-sectional view of a conventional electric double layer capacitor.

Electric double layer capacitors and electrolyte batteries are generally rectangular parallelipipeds or columnar in shape. However, as shown in FIG. 5, in the case of a columnar shape, dead space (70) is created when mounting on a circuit board (7), so a rectangular solid is preferable in order to make effective use of the surface area on the circuit board (7).

What is claimed is:

1. An electric double layer capacitor, comprising:
   a cell in which a pair of polarizable electrodes, which are impregnated with an electrolyte, are disposed in opposition on either side of a separator;
   wherein the polarizable electrodes are provided with collector electrodes and a peripheral portion of the cell is sealed by a sealing member composed of synthetic resin;
   wherein the collector electrodes are composed of an alloy made of crystal grains of differing components and wherein the collector electrodes pass through the sealing member while in intimate contact with the sealing member, extending to the outside of the sealing member; and
   wherein a metal plated layer made of crystal grains of a single component is formed on those locations on the collector electrodes that pass through the sealing member.

2. The electric double layer capacitor according to claim 1, wherein the alloy contains iron.

3. The electric double layer capacitor according to claim 1, wherein the metal plated layer is formed on a rough surface portion, on the collector electrodes, that has been subjected to a surface roughening process.

4. The electric double layer capacitor according to claim 1, wherein the sealing member is formed from synthetic resin containing sulfur.

5. The electric double layer capacitor according to claim 1, wherein the metal plated layer is formed from nickel.

6. The electric double layer capacitor according to claim 3, wherein the rough surface portion is bent to form a stepped portion inside the sealing member.

7. An electrolyte battery, comprising:
   a cell in which a pair of active material bodies, which are impregnated with an electrolyte, are disposed in opposition on either side of a separator;
   wherein the active material bodies are provided with collector electrodes and a peripheral portion of the cell is sealed by a sealing member composed of synthetic resin;

wherein the collector electrodes are composed of an alloy made of crystal grains of differing components and wherein the collector electrodes pass through the sealing member while in intimate contact with the sealing member, extending to the outside of the sealing member; and wherein a metal plated layer made of crystal grains of a single component is formed on those locations on the collector electrodes that pass through the sealing member.

* * * * *